(12) United States Patent
Zou

(10) Patent No.: US 11,008,225 B2
(45) Date of Patent: May 18, 2021

(54) WATER FILTER PITCHER WITH SENSING CAPABILITIES

(71) Applicant: Qingdao Ecopure Filter Co., Ltd, Qingdao (CN)

(72) Inventor: Zhibin Zou, Qingdao (CN)

(73) Assignee: QINGDAO ECOPURE FILTER CO., LTD., Qingdao (CN)

( * ) Notice: Subject to any disclaimer, the term of this patent is extended or adjusted under 35 U.S.C. 154(b) by 0 days.

(21) Appl. No.: 16/441,191

(22) Filed: Jun. 14, 2019

(65) Prior Publication Data

US 2020/0392015 A1    Dec. 17, 2020

(51) Int. Cl.
*C02F 1/00* (2006.01)
*B01D 35/143* (2006.01)
*A47G 19/12* (2006.01)

(52) U.S. Cl.
CPC ............ *C02F 1/003* (2013.01); *B01D 35/143* (2013.01); *B01D 2201/56* (2013.01); *C02F 2209/445* (2013.01); *C02F 2307/04* (2013.01)

(58) Field of Classification Search
CPC ................ C02F 1/003; C02F 2209/445; C02F 2209/44; C02F 2307/04; B01D 2201/56
See application file for complete search history.

(56) References Cited

U.S. PATENT DOCUMENTS

| | | | |
|---|---|---|---|
| 2008/0047883 A1* | 2/2008 | Fedotov | C02F 1/003 210/91 |
| 2012/0152004 A1* | 6/2012 | Bari | B01D 35/143 73/61.61 |
| 2013/0083884 A1* | 4/2013 | Ma | B01D 35/143 377/15 |

* cited by examiner

*Primary Examiner* — Benjamin M Kurtz
(74) *Attorney, Agent, or Firm* — Calfee Halter & Griswold LLP

(57) ABSTRACT

A water pitcher with sensing capabilities is provided. The water pitcher includes at least a container adapted or otherwise shaped for retaining water therein, and a cover adapted to cover at least a portion of the container. The water pitcher further includes an indication assembly attached to the container and/or the cover. The indication assembly includes at least a sensor for detecting movement of contents within the water pitcher and/or movement of the pitcher upon expiration of a filter within the pitcher. Upon detecting movement of the pitcher, the sensor is configured to activate an indicator (e.g., an LED) for notifying a user of the expired filter and/or movement of the pitcher during the expiration period of the filter.

15 Claims, 4 Drawing Sheets

WATER FILTER PITCHER WITH SENSING CAPABILITIES

TECHNICAL FIELD

The present disclosure relates generally to pitchers for dispensing/pouring fluids and/or liquids therefrom, and more particularly, to a water filter pitcher with sensing capabilities provided, for example, via a sensor (e.g., a motion sensor).

BACKGROUND

Water filtration systems have become popular as they assist to produce cleaner and better tasting water. In households, water filtration systems include, for example, water pitcher filtration systems, refrigeration filtration systems, faucet filtration systems, and the like. Some of these filtration systems (e.g., the water pitcher filtration system) include a removable (replaceable) filter for which water passes through to remove particles, chemicals, microbes and the like. Filters for these systems typically require changing periodically. For changing the replaceable filter, and more particularly, for notifying users that a filter change is appropriate and/or necessary, a number of techniques have been utilized for indicating when the replaceable filter should be changed. Some techniques use flow sensors or float sensors in contact with the water, and/or switches coupled to a fill lid, or the like, to measure the amount of filtered water poured from the water pitcher filtration system. These techniques are relatively complicated to manufacture, and may also introduce impurities and/or microbes into the water while in contact with the water. Other techniques may use a timer for changing the filter after a predetermined period of time. However, timer techniques proves less reliable, for example, in instances where more filtered water is poured during the predetermined time period than what was initially anticipated when determining the appropriate predetermined time period. In this example, the filter may need to be changed more often than the timer indicates, which may lead to the consumption of unfiltered water.

Accordingly, a need exists for improved techniques for monitoring filters and notifying users of when the filter requires changing.

SUMMARY

In an exemplary embodiment, a pitcher for dispensing or otherwise pouring fluids and/or liquids therefrom is provided.

The pitcher may be a water pitcher and may include at least a container adapted for retaining water therein, and a cover (top cap) adapted to interface or otherwise cover the container, for example, at an upper end of the container. The cover may include an indication assembly selectively secured to an underside of the cover such that a sensor (e.g., a motion sensor) of the indication assembly can detect and/or otherwise sense the water within the container and/or movement of the container/pitcher from its resting position. In operation, the motion sensor is operable to communicate and/or activate an indicator (e.g., light emitting diode), or similar notifying system and/or device, upon detecting motion within the container and/or movement of the container/pitcher (e.g., following the expiry of a filter and/or filter assembly's lifecycle).

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
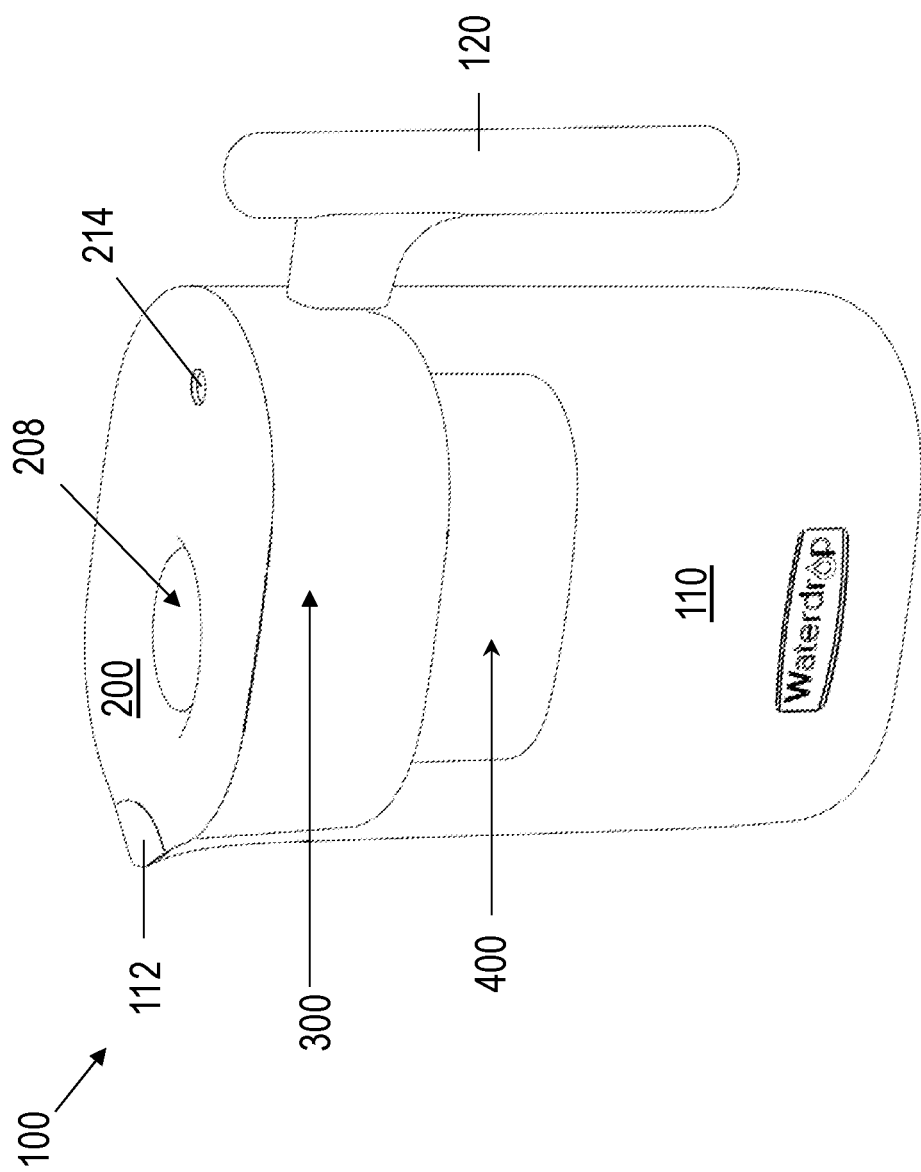
FIG. 1 illustrates an exemplary embodiment of a pitcher in accordance with the disclosure provided herein.

Referring now to the drawings, which are for purposes of illustrating exemplary embodiments of the subject matter herein only and not for limiting the same, FIG. 1 shows an exemplary embodiment of a pitcher 100 (e.g., a water pitcher 100) including sensing capabilities.

As shown in FIG. 1, the pitcher 100 may include at least a container 110 and a top cap (cover) 200 adapted for covering an opening 112 of the container 110. The pitcher 100 may further include an indication assembly 300 and a filter assembly 400 removably secured at least partially within the container 110, and in some embodiments, removably attached to the cover 200.

The container 110 may be adapted or otherwise shaped for retaining fluids and/or liquid substances (e.g., water and/or hot water) therein. It should be appreciated that pitcher 100 described herein may be used for any fluids and/or liquid substances, and that references to water herein are for exemplary purposes only, and not for limiting said pitcher 100 to a particular fluid and/or liquid substance.

In some embodiments, the container 110 may be formed from a body defining at least an interior, an exterior, an upper end, and a lower end. For retaining water, the container 110 may include a cavity (not shown) having a depth for retaining water therein. The cavity may be defined in the body of the container 110 forming the interior of the container and defining the opening 112 at the upper end. the opening 112 may be adapted or otherwise shaped for interfacing with and/or receiving the cover 200 (e.g., at least partially therein) for covering the opening 112, or in some embodiments, at least a part of the opening 112 (e.g., as shown in FIG. 1).

Additionally, or alternatively, the pitcher 100 may include a handle 120 selectively attached to an exterior of the container 110. The handle 120 may be integrally formed with the container 110, or in some embodiments, may be attached to the container via one or more fasteners or other means known to persons of ordinary skill in the art for attaching a handle 120 to the container 110.

Figure 2:
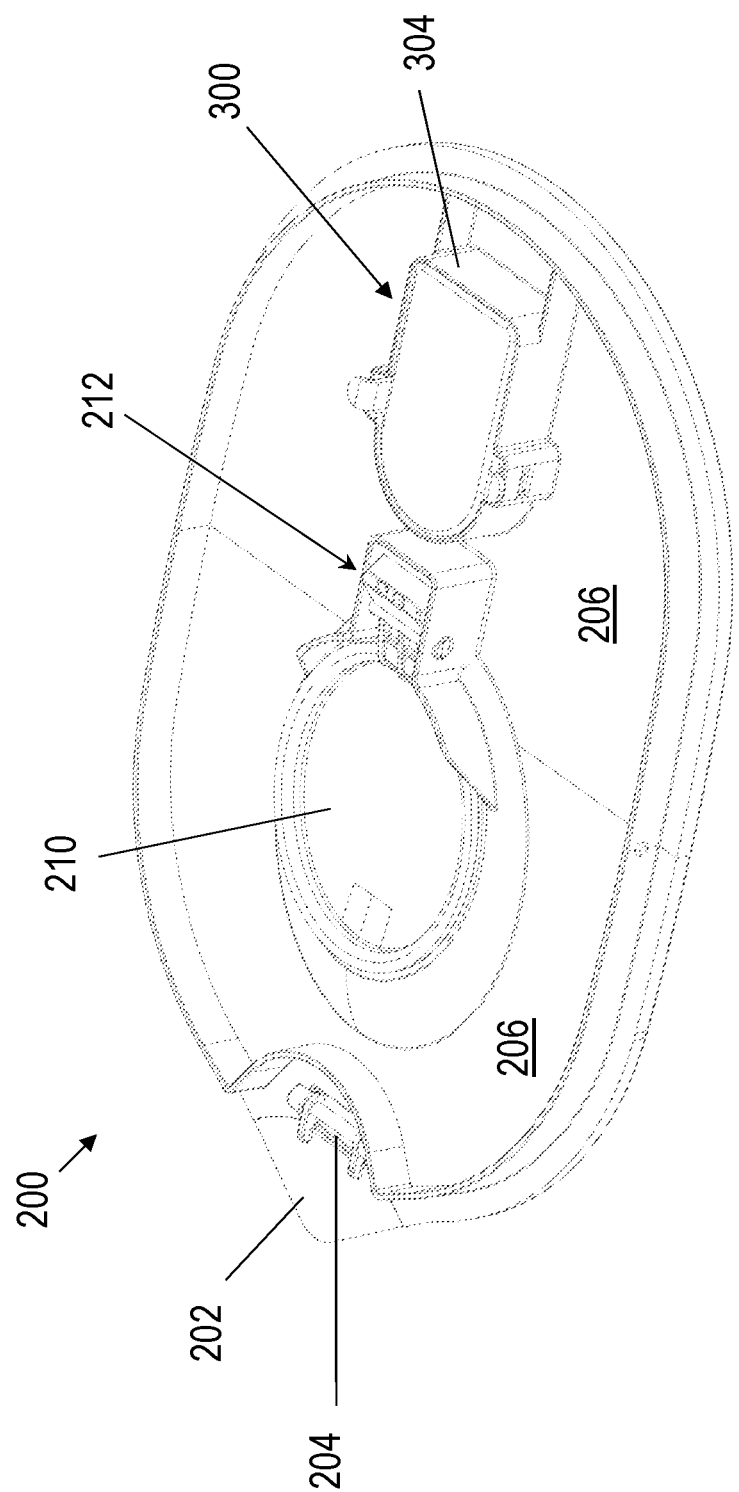
FIG. 2 illustrates an exemplary embodiment of a top cap for use with exemplary embodiments of a pitcher in accordance with the disclosure provided herein.

With continued reference to the figures, and with reference now to FIG. 2, in some embodiments, the cover 200 may be adapted or otherwise shaped for interfacing and/or engaging the container 110, for example, at the upper end of the container 110, for covering at least a portion of the opening 112 where water may be dispensed (e.g., poured). It should be appreciated that, in some embodiments, the full opening 112 (not shown) may be covered by the cover 200. Additionally, or alternatively, the cover 200 may be adapted to cover the full opening 112 during a non-pouring activity (e.g., when the pitcher 100 is in a stationary position), and adapted to at least partially uncover the opening 112 during a pouring activity, for example, via a pouring flap 202. It should be appreciated that the flap 202 may be integrally formed with the cover 200 and adapted to open during the pouring activity, or in some embodiments, the pouring flap 202 may be selectively attached to the cover by a pivoting assembly 204 or similar attaching mechanism known to persons of ordinary skill in the art and operable to open the pouring flap 202 during the pouring activity and to close the pouring flap 202 while the pitcher 100 is in a resting position. The pivoting assembly 204 may be included on an underside 206 of the cover 200.

With continue reference to the figures, the cover 200 may include one or more apertures, openings, or the like. In some embodiments, a first aperture (also referred to as an inlet or water inlet) 208 may be provided in the cover 200 for feeding or otherwise pouring water into the container 110, and, in some embodiments, for example, via the filter assembly 400. The cover 200 may further include an inlet cap 210. The inlet cap 210 may be adapted or otherwise shaped for covering the water inlet 208. In some embodiments, the inlet cap 210 may be secured to cover 200, for example, via an inlet cap securing assembly 212 or similar attachment mechanism. In some embodiments, the inlet cap securing assembly 212 may be similar and/or similarly configured to the pivoting assembly 204 in that it may be operably configured to secure the inlet cap 210 to the cover 200 in an open position when feeding water into the container 110, and in a closed position, for example, during non-feeding activities (e.g., while the pitcher 100 is in a resting position).

Additionally, or alternatively, a second aperture 214 may be provided in the cover 200, for example, to provide a visual notification or similar aid to users for indicating or otherwise identifying when the pitcher 100 has been moved and/or requires maintenance (e.g., filter maintenance).

Figure 3:
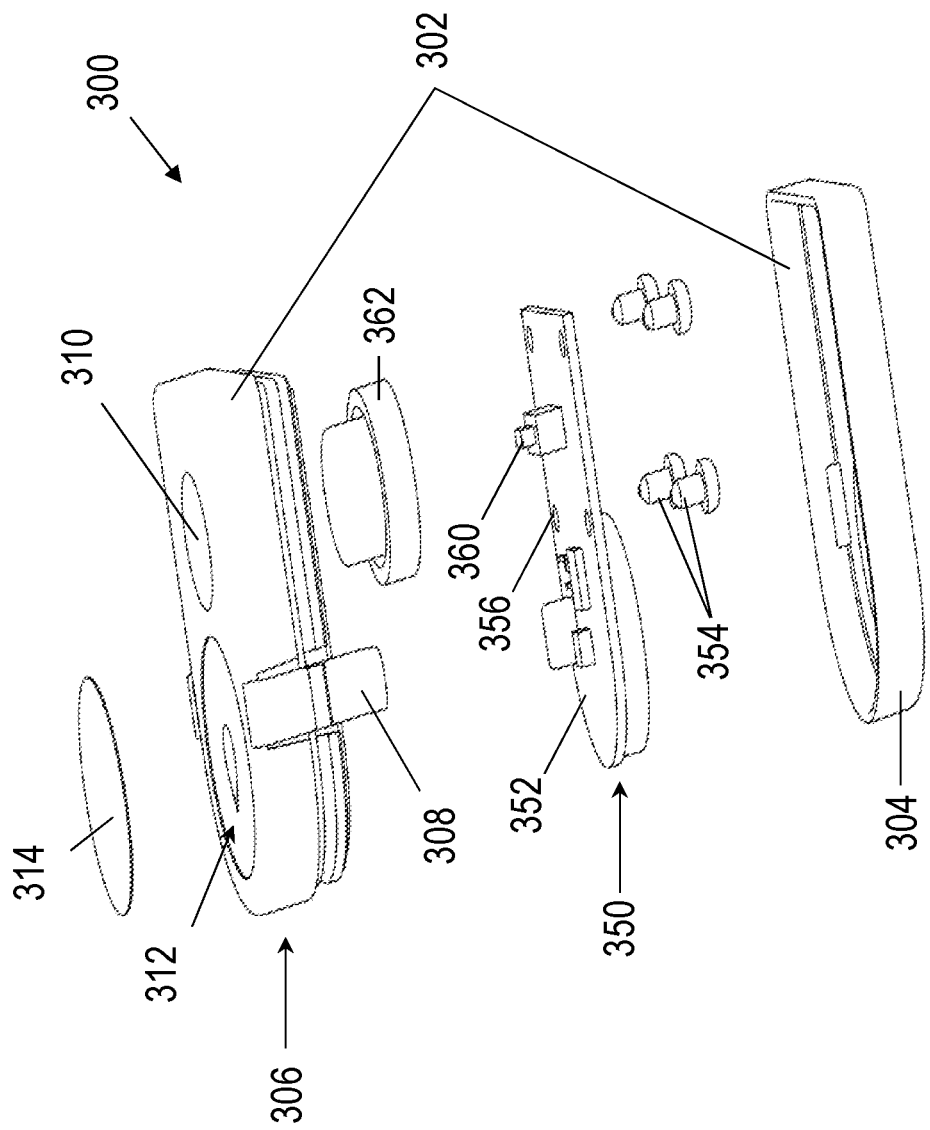
FIG. 3 illustrates a sensing assembly for use with exemplary embodiments of a top cap and/or a pitcher in accordance with the disclosure provided herein.

With continued reference to the figures, and with reference now to FIG. 3, the container 110 may include an indication assembly or system 300 operably configured for inspecting or otherwise sensing contents (e.g., water) within the pitcher 100 and/or movement of the pitcher 100 (e.g., from the resting position).

In some embodiments, the indication assembly 300 may include a housing 302 adapted or otherwise sized for retaining and/or otherwise securing one or more sensors 358 therein. The housing 302 may be selectively attached to the cover 200 (e.g., a body of the cover on the underside 206 (also referred to as an under surface of the cover 200). In some embodiments, the housing 302 may include a housing base 304 and a housing cover 306. The housing base 304 may be attached to the underside 206 of the cover 200, or in some embodiments, integrally formed with the cover 200 at the underside 206. The housing cover 306 may include one or more housing clips 308 for removably attaching the housing cover 306 to the housing base 304 and/or the cover 200 (e.g., at the underside 206). The housing cover 306 may be adapted or otherwise shaped for covering and/or enclosing a sensor and/or sensor assembly 350 therein when attached to the housing base 304 and/or the cover 200. It should be appreciated that the sensor assembly 350 may be removably secured to the housing 302, or in some embodiments, to the cover 200, via one or more fasteners 354 or via other securing means known to persons of ordinary skill in the art for securing the sensor assembly 350 in the pitcher 100.

In some embodiments, the housing cover 306 may include at least one housing cover opening 310. The housing cover opening 310 may be adapted or otherwise shaped for providing access one or more components/parts of the sensor assembly 350 (e.g., a sensor assembly button 360 or button cover 362).

In some embodiments, the housing cover 306 may include a second housing cover opening 312. The second housing cover opening 312 may be adapted or otherwise shaped for providing access to an indicator 364 (FIG. 4), for example, a light emitting diode (LED). In some embodiments, a housing cover cap 314 may be provided and adapted or otherwise shaped for covering the second housing cover opening 312. In some embodiments, the housing cover cap 314 may be optically transparent (i.e., formed from optically transparent materials) such that the indicator 364 (e.g., an activated LED) may be identified (e.g., seen) through the housing cover cap 314 when covering the second housing cover opening 312. It should be appreciated that the housing cover cap 314 may be formed from non-transparent materials, and instead, may include an opening or similar void in the housing cover cap 314 for identifying the indicator 364.

Figure 4:
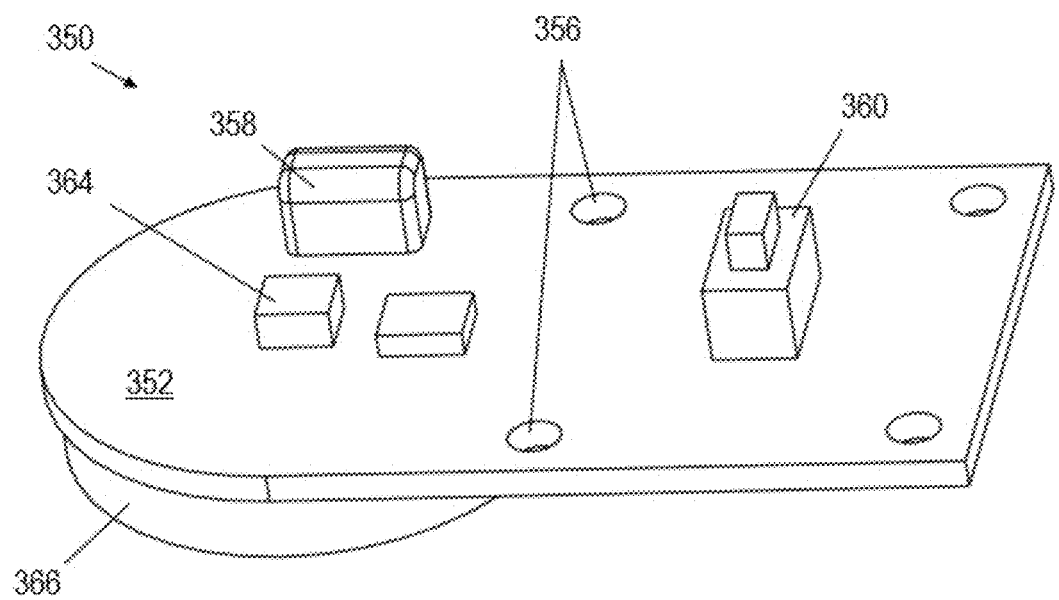
FIG. 4 illustrates an exemplary embodiment of a printed circuit board of a sensing assembly in accordance with the disclosure provided herein.

With continued reference to the figures, and now with reference to FIG. 4, the sensor assembly 350 include a printed circuit board (PCB) 352 having one or more component operably attached thereto. In some embodiments, the PCB 352 may include one or more openings 356 (4 shown) adapted or otherwise sized for at least partially receiving the fasteners 354 therethrough for securing the sensor assembly 350 (e.g., via the PCB 352) to the housing 302 and/or cover 200.

The sensor assembly 350 may further include one or more sensors 358 attached to the PCB 352. In some embodiments, the sensor 358 may be a motion sensor (e.g., A MEMS digital output motion sensor) configured for detecting or otherwise sensing movement of contents (e.g., water) within the pitcher 100 and/or for detecting or otherwise sensing movement of the pitcher 100 (e.g., from a resting position).

In some embodiment, the sensor 358 may be configured to sense movement of the pitcher 100, for example, after expiry of a filter of the filter assembly 400. That is, upon expiration of the filter (e.g., of the filter assembly), which may occur after a predetermined time period and/or after a number of pouring attempts, the sensor 358 may be activated for sensing movement of the pitcher 100, for example, from one position to another, and for notifying the user of the expired filter.

In some embodiments, for detecting movement, the sensor may be configured gesture recognition, activity and/or vibration monitoring, and/or lasers guides operably configured for detecting movement of the pitcher 100 from one position to another.

Additionally, or alternatively, the sensor 358 may be configured to active only during the expiry of the filter. In this embodiment, the sensing capabilities of the sensor 358 may be blocked and/or deactivated during the lifecycle of the filter.

Upon detecting movement of the pitcher 100 (e.g., following the filter's expiration), the sensor 358 may be configured to transmit one or more signals and/or other information associated with the detected movement to the indicator 364 and/or indicator assembly for notifying the user of the detected movement and/or the expiration of the filter.

It should be appreciated that the indicator 364 may be included with the indication assembly 300, the sensor assembly 350, or provided an independent assembly/system in operable communication with the other assemblies and/or components of the other assemblies, for example, for receiving any signals for notifying the user of the expired status of the filter and/or movement of pitcher 100.

In some embodiments, the indicator 364 may be in communication with the sensor 358 (e.g., via wiring or other type of communication known to one of ordinary skill in the art) for receiving signals from the sensor 358, which may be associated with the sensor 358 sensing movement of the pitcher 100. The indicator 364 may include an LED or similar device operably configured activate upon receiving or otherwise accessing signals from the sensor 358 to notify the user of any movement. It should be appreciated that the sensor 358 and/or sensor assembly 350 may include programming logic including executable instructions, which may be executed by a processor (not shown) of the sensor assembly 350. In some embodiments, the logic may include instructions for sensing the movement, instructions for transmitting signals associated with the sensed movement to the indicator 364 and/or a user device, instructions for activating and/or deactivating one or more components of the indication assembly 300 (e.g., the indicator 364), and/or instructions for communicating with the filter assembly 400, for example, to identify or otherwise receiving information associated with the expiration of the filter.

Additionally, or alternatively, the cover 200 may include an interface and/or one or more cover openings. The cover opening may be adapted or otherwise shaped for at least partially receiving an interface of the indication assembly 300 and/or the filter assembly therein. In some embodiments, the interface may be in communication with the indication assembly 300 and/or filter assembly for displaying (e.g., via a display) information associated with the sensing via the indication assembly 300 (e.g., motions detected and/or contents remaining) and/or filtering via the filtering assembly (e.g., time remaining before maintenance and/or expiration of the filter lifecycle).

Additionally, or alternatively, the sensor assembly 350 may include a button 360 (e.g., a depressible button) attached to the PCB 352. In operation, and upon depressing the button 360, the sensor 358 and/or the indicator 364 notifying the user of the movement and/or expiration of the filter may be reset. In some embodiments, resetting the sensor 358 may cause the sensor 358 to stop sensing movement (e.g., of the pitcher 100) until after a new filter's lifecycle expires (i.e., after the expiration of the filter replacing the expired filter that triggered the sensing capabilities). In some embodiments, a button cover 362 may be provided for protecting the button 360 and/or PCB 352 or components attached to the PCB 352. It should be appreciated that the button cover 362 may be adapted or otherwise sized to interface with the button 360 for depressing the button 360 using the button cover 362 while remaining accessible (e.g., to the user) via the housing cover opening 310.

In some embodiments, the sensor assembly 350 may include a battery 366 and/or similar means for supplying power to the sensor 358 and/or sensor assembly 350 (e.g., via the PCB 352).

Additionally, alternatively, one or more assemblies and/or systems of the pitcher 100 (e.g., the indication assembly 300 and/or sensor assembly 350) may be configured to transmit information associated with the detected movement to a user device (not shown), e.g., over a network (e.g., a wired and/or wireless network).

The wireless networks may include, e.g., a local area network, a wide area network, a mobile data and/or satellite network, and or any other network type known to persons of ordinary skill in the art and configurable for transmitting information from the indication assembly 300 to the user device.

Examples of the user device may be a mobile device (e.g., a cell phone and/or tablet), a computer, and/or similar devices and/or systems configurable for receiving information from the indication assembly 300. For receiving or otherwise communicating information with the indication assembly 300, the user device may include a device application (e.g., a device compatible application associated with the pitcher 100 and/or its assemblies) configured to interface with the indication assembly 300 for transmitting information associated with the detected movement between the indication assembly 300 and the user via the user device.

With continued reference to the figures, the filtration assembly 400 may be removably secured within the pitcher 100 and/or removable attached to the cover 200 and/or other assembly within the pitcher 100 (e.g., indication assembly 300). The filtration assembly 400 may include at least a filter housing adapted or otherwise shaped to enclose at least a filter cartridge and/or other filter type therein. In some embodiments, the filter cartridge may be a water filter cartridge.

In some embodiments, the filtration assembly 400 may be included (e.g., arranged) in the pitcher 100 such that the water in the pitcher can be filtered via at least a part of the water filter cartridge while feeding water into the container 110 (e.g., via the water inlet 208) and/or while the water is being poured from the pitcher 100.

It should be appreciated that the filter cartridge may have a lifecycle corresponding to a time period for which the filter cartridge may be used for effectively filtering water. The time period may be predetermined based on one or more specification, which may be provided by the manufacturer of the filter cartridge. In some embodiments, upon expiration of the lifecycle, i.e., the end of the time period, the filtration assembly 400 may include circuitry, e.g., a processor, memory, and executable instructions (e.g., stored on the memory), for communicating the expiration of the filter, for example, to the indication assembly 300 and/or sensor assembly 350, so that the sensor 358 may begin sensing movement of the pitcher 100, for example, during the expiration time period, to notify the user about the expired filter.

In some embodiments, replacing the expired filter may automatically cause the sensor 358 to stop sensing for movement of the pitcher 100. Additionally, or alternatively, changing the expired filter may cause the filtration assembly 400 to deactivate the sensing capabilities of the sensor 358 until the next expiration time period. It should further be appreciated that deactivating the sensor 358 upon changing the expired filter may also result in the indicator 364 also being deactivated.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

I claim:

1. A pitcher comprising:
   a container;
   a cover adapted to cover at least a portion of the container;
   a filter having an expiration period and arranged for filtering contents of the container;
   an indication assembly attached to the container or the cover, wherein the indication assembly includes a sensor for detecting a movement of the pitcher, wherein the sensor identifies the expiration period for the filter and activates only upon expiry of the filter to detect movements.

2. The pitcher of claim 1, further comprising:
   an indicator in communication with the sensor, and wherein upon expiry of the filter the sensor detects the movement of the pitcher and activates the indicator to notify a user about the filter expiring or movement of the pitcher.

3. The pitcher of claim 2, wherein the indicator includes a light emitting diode.

4. The pitcher of claim 1, further comprising:
   a display in communication with the indication assembly and configured to display information associated with the filter expiring or detected movement.

5. The pitcher of claim 4, wherein the display is attached to the cover such that a user is notified via the display about the filter expiring or the detected movement upon expiry of the filter.

6. The pitcher of claim 1, wherein the filter is arranged in the pitcher such that the filter engages the contents of the pitcher during a content feeding operation or a pouring operation.

7. The pitcher of claim 1, further comprising:
   a handle extending from an exterior of the container.

8. A water filtration system comprising:
   a user device; and
   a pitcher in communication with the user device, wherein the pitcher includes:
   a container;
   a cover adapted to cover at least a portion of the container;
   a filter having an expiration period and configured for filtering contents of the container;
   an indication assembly attached to the cover, wherein the indication assembly includes a sensor for detecting a movement of the pitcher upon expiry of the filter, wherein the sensor identifies the expiration period and activates only upon expiry of the filter to detect movements and transmits information corresponding to the filter expiring or the detected movement to the user device for notifying a user about the filter expiring or the detected movement.

9. The system of claim 8, further comprising:
   an indicator selectively attached to the cover and in communication with the sensor, and wherein upon expiry of the filter the sensor detects the movement of the pitcher and activates the indicator to notify the user about the filter expiring or movement of the pitcher.

10. The system of claim 9, wherein the indicator includes a light emitting diode.

11. The system of claim 8, wherein the filter is arranged in the pitcher such that the filter engages the contents of the pitcher during a content feeding operation or a pouring operation.

12. A cover for a pitcher comprising:
    a cover body adapted to cover at least a portion of an opening of the pitcher, wherein the cover body includes an upper surface and an under surface;
    a filter removably attached to the cover body at the under surface, and arranged such that fluid poured through an opening in the cover body engages at least a part of the filter for filtering the fluid; and
    an indication assembly removably attached to the cover body at the under surface, wherein the sensor assembly includes a sensor for detecting a movement of the pitcher upon expiry of the filter, wherein the sensor identifies an expiration period for the filter and activates only upon expiry of the filter to detect movements and transmits information corresponding to the filter expiring or the detected movement to an indicator for notifying a user about the filter expiring or the detected movement.

13. The cover of claim 12, wherein the indicator is an LED.

14. The cover of claim 12, wherein the indicator is a user device.

15. The cover of claim 12, wherein the filter is adjacent to the indication assembly at the under surface of the cover.

* * * * *